US006862402B2

(12) United States Patent
Kim

(10) Patent No.: US 6,862,402 B2
(45) Date of Patent: Mar. 1, 2005

(54) DIGITAL RECORDING AND PLAYBACK APPARATUS HAVING MPEG CODEC AND METHOD THEREFOR

(75) Inventor: Jae-hyun Kim, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/174,573

(22) Filed: Oct. 19, 1998

(65) Prior Publication Data

US 2002/0118953 A1 Aug. 29, 2002

(30) Foreign Application Priority Data

Dec. 20, 1997 (KR) .......................................... 97-071307

(51) Int. Cl.[7] .............................. H04N 5/76; H04N 7/12
(52) U.S. Cl. .................................. 386/111; 375/240.04
(58) Field of Search ..................... 386/52, 64, 111–112, 386/98, 96; 375/240.04, 240.05, 240.21; 356/52, 64, 111, 112, 98, 96

(56) References Cited

U.S. PATENT DOCUMENTS

| | | | | |
|---|---|---|---|---|
| 5,047,852 A | * | 9/1991 | Hanyu et al. ................ 386/124 |
| 5,333,012 A | | 7/1994 | Shinghal et al. ............ 348/405 |
| 5,347,308 A | * | 9/1994 | Wai ........................ 375/240.23 |
| 5,436,665 A | * | 7/1995 | Ueno et al. ............. 375/240.21 |
| 5,515,105 A | | 5/1996 | Lim ................................ 348/405 |
| 5,598,213 A | | 1/1997 | Chung et al. ................ 348/405 |
| 5,617,145 A | * | 4/1997 | Huang et al. ............. 348/423.1 |
| 5,635,985 A | * | 6/1997 | Boyce et al. ................ 348/402 |
| 5,650,860 A | * | 7/1997 | Uz ........................... 375/240.24 |
| 5,699,119 A | * | 12/1997 | Chung et al. .......... 375/240.04 |
| 5,742,347 A | * | 4/1998 | Kandlur et al. ............. 348/441 |
| 5,748,249 A | * | 5/1998 | Fujiwara ................. 375/240.04 |
| 5,907,362 A | * | 5/1999 | Yamamoto ............. 375/240.04 |
| 6,009,236 A | * | 12/1999 | Mishima et al. ............. 386/111 |
| 6,014,493 A | * | 1/2000 | Shimoda ....................... 386/68 |
| 6,016,162 A | * | 1/2000 | Odaka et al. ........... 375/240.04 |
| 6,097,877 A | * | 8/2000 | Katayama et al. ............. 386/68 |
| 6,141,490 A | * | 10/2000 | Oishi et al. .................... 386/98 |
| 6,157,771 A | * | 12/2000 | Brewer et al. ................. 386/69 |

FOREIGN PATENT DOCUMENTS

| | | | | |
|---|---|---|---|---|
| EP | 0 626 789 A2 | 11/1994 | ............ H04N/7/13 |
| EP | 0 772 363 A2 | 5/1997 | ............ H04N/7/26 |
| JP | 8-129830 | 5/1996 | ............ G11B/20/10 |

OTHER PUBLICATIONS

IEEE Transactions on Consumer Electronics, US, IEEE Inc. New York; Kenji Sugiyama, et al.; "Video Disc System Using Variable Bit Rate"; Aug., No. 3.

* cited by examiner

Primary Examiner—Thai Tran
(74) Attorney, Agent, or Firm—Sughrue Mion, PLLC

(57) ABSTRACT

A digital recording and playback apparatus adopting an MPEG encoder and decoder, and a method thereof. The digital recording and playback apparatus includes: a first encoder for coding input video data in picture units, and outputting coded video data; a second encoder for coding input audio data and outputting coded audio data; a packetized elementary stream (PES) packetizer for packetizing the coded video data and audio data and user data into each PES, and outputting a video PES, audio PES and user PES; and a transport stream (TS) packetizer for multiplexing the video PES, audio PES and user PES into a TS. The digital recording and playback apparatus can be compatible with a digital television or multimedia applications adopting the MPEG standard, and can perform editing in picture units as well as high-speed search.

21 Claims, 4 Drawing Sheets

DIGITAL RECORDING AND PLAYBACK APPARATUS HAVING MPEG CODEC AND METHOD THEREFOR

BACKGROUND OF THE INVENTION

1. Field of the Invention

The present invention relates to a digital recording and playback apparatus adopting a moving picture experts group (MPEG) coder/decoder (CODEC), and a method therefor, and more particularly, to a digital recording and playback apparatus for a digital video camcorder, which is compatible with all apparatuses adopting the MPEG standard, in which an image signal is coded and decoded according to the MPEG-2 standard, and a method therefor.

2. Description of the Related Art

Following the MPEG-1 standard, the MPEG-2 standard has been introduced because of the need for a high quality picture at a higher bit rate. The MPEG-2 standard is applied in the broadcasting media field as well as the storage media field, and can provide quality higher than that provided by current analog television. Also, the MPEG-2 standard can be applied to a high definition television (HDTV). Thus, the MPEG-2 standard can be applied over a wide range, including telecommunication, home appliances, computers and broadcasting systems.

According to the trend for such high quality, an original standard for compression coding in a digital camcorder for recording and playing back a moving image was developed in Japan. However, this standard is not compatible with MPEG, and thus it is impossible to play back the coded data with a digital television or a multimedia system adopting the MPEG coding method, which will be widespread in the future.

Also, the HD digital video cassette recorder (VCR) conference was established in 1993, to suggest the basic specification of a digital video format and discuss the HDTV specification based on the basic standard. The HD-VCR Conference has decided on the standards for specifications of a standard definition (SD) format and a high definition (HD) format. The selected standards contemplate a rotary head scan method (helical scan), a compression method based on a discrete cosine transform (DCT), and a video tape having a width of ¼ inch for the basic specification. Also, according to a HD baseband format, the sampling frequency of the HDTV is set to 50.4 MHz, which is three times the sampling frequency (13.5 MHz) for SD, and a recording rate of video data is set to 50 Mbps, which is twice the recording rate (25 Mbps) for SD.

After the selection of an international standard for a next generation VCR and camcorder, a camcorder for SD has spread rapidly. In order to cope with the current trends, a digital television (DTV) using MPEG-2 and a digital video camcorder compatible with other applications are required.

Also, a digital television (DTV) working group (WG) for discussing formats for recording a DTV signal was established in the U.S. in 1994, and a digital video broadcasting (DVB) WG was established in Europe to discuss formats for recording a DVB signal.

When recording a DTV signal which has been compressed at a data rate of 19.3 Mbps on a video tape having an SD format, the signal is recorded at a video data rate of 25 Mbps for SD. When recording a DVB signal on a video tape having the SD format, by controlling the data rate of the DVB signal to be 10 Mbps or less, the recording is performed at 12.5 Mbps which is the half of the video data rate for SD, or at 6.25 Mbps which is a quarter of that for SD.

Because the DTV and DVB signals both adopt the compression coding method based on MPEG-2, a digital recording and playback apparatus having a format capable of recording the data compressed by the MPEG-2 method is required. However, because in MPEG-2 a high compression is performed in group of picture (GOP) units including a plurality of pictures, using correlation among those pictures, if the compressed data having this structure is simply recorded on a tape as it is, it is difficult to form the image during playback at multiple times speed (high-speed search), lowering the image quality.

In a conventional VCR, it is essential to edit the data in picture units and search at high-speed. Thus, the following method for achieving those functions has been introduced. For example, the video data rate for the SD format is 25 Mbps, while a DTV signal has a data rate of 19.3 Mbps, so the extra region corresponding to the difference between the compression rate and recording rate is used for high-speed search. That is, the data compressed by intra coding in GOP units is repeatedly recorded in a specific region of a video tape, so an image of a picture is constituted using the repeatedly recorded data, during playback at a multiple times speed.

When recording a DTV signal including data compressed by MPEG-2 at a rate of 19.3 Mbps and the compressed data is repeatedly recorded on a video tape, a high speed search (one of the main functions of a digital VCR) is possible. However, because the compression coding is performed in GOP units containing a plurality of pictures, it is impossible to edit the data in picture units, and the picture quality is lower than the SD data.

A conventional digital video camcorder for SD performs compression in picture units and independently in segment units having a predetermined number (in general, five) of macroblocks, so search in picture units and high-speed search can be performed. However, the conventional digital video camcorder is not compatible with apparatuses adopting the MPEG-2 standard.

SUMMARY OF THE INVENTION

To solve the above problems, it is an objective of the present invention to provide a digital recording and playback apparatus for compression coding an image signal based on the MPEG-2 standard and decoding the coded image signal.

It is another objective of the present invention to provide a digital recording and playback method for coding an image signal to allow a high-speed search and editing in picture units, and for decoding the coded image signal.

To achieve the first objective, there is provided a digital recording and playback apparatus for recording and playing back digital data, comprising: a first encoder for coding input video data in picture units, and outputting coded video data; a second encoder for coding input audio data and outputting coded audio data; a packetized elementary stream (PES) packetizer for packetizing the coded video data and audio data and user data into each PES, and outputting a video PES, audio PES and user PES; and a transport stream (TS) packetizer for multiplexing the video PES, audio PES and user PES into a TS.

Preferably, the digital recording and playback apparatus further comprises: a TS depacketizer for extracting a video PES, audio PES and user PES from the TS; a PES depacketizer for depacketizing the video PES, audio PES and user PES into a video bit stream, audio bit stream and user bit stream, respectively; a first decoder for restoring the video data from the video bit stream; and a second decoder for restoring the audio data from the audio bit rate.

To achieve the second objective, there is provided a digital recording and playback method comprising the steps of: (a) coding input video data in picture units to generate coded video data; (b) coding input audio data to generate coded audio data; (c) packetizing the coded video data into a packetized elementary stream (PES) to generate a video PES; (d) packetizing the coded audio data into a PES to generate an audio PES; (e) packetizing user data into a PES to generate a user PES; and (f) multiplexing the video PES, audio PES and user PES into a transport stream (TS).

Preferably, the digital recording and playback method further comprises the steps of: (g) extracting a video PES, audio PES and user PES from the TS; (h) depacketizing the video PES into a video bit stream; (I) depacketizing the audio PES into an audio bit stream; (j) depacketizing the user PES into the user data; (k) restoring the video data from the video bit stream; and (l) restoring the audio data from the audio bit stream.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Figure 1:
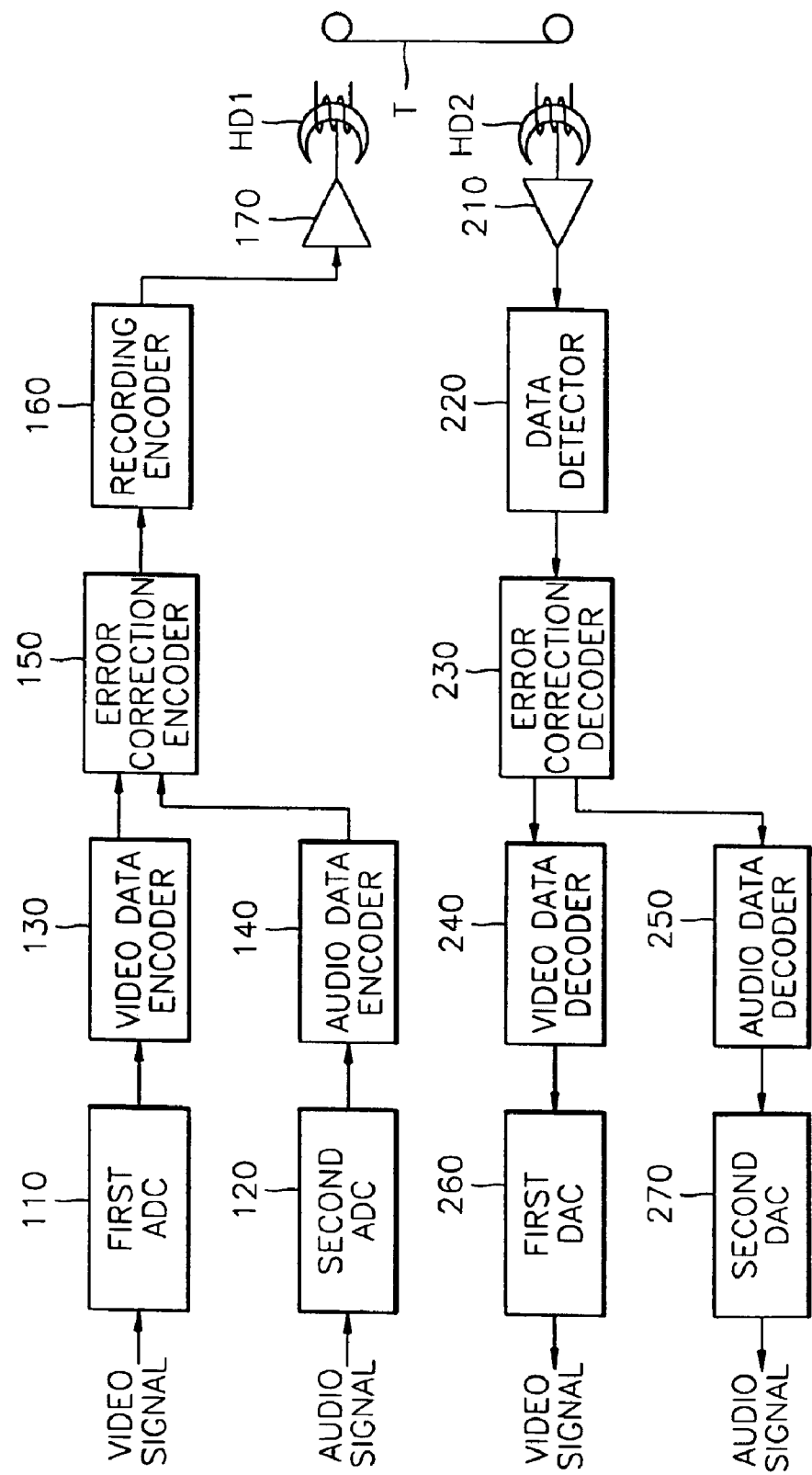
FIG. 1 is a block diagram of a general digital recording and playback apparatus.

In a general digital recording and playback apparatus, shown in FIG. 1, input analog video and audio signals are converted into digital data by first and second analog-to-digital converters (ADC) 110 and 120, respectively. Also, the video data supplied from the first ADC 110 is compressed through a high-efficiency coding by a video data encoder 130, and then applied to an error correction encoder 150. The audio data supplied from the second ADC 120 is coded by an audio data encoder 140 to be suitable for recording, and then applied to the error correction encoder 150. The error correction encoder 150 mixes the video data supplied from the video data encoder 130 and the audio data supplied from the audio data encoder 140, adds a parity to the data using an error correction code, e.g., reed solomon (RS) code, and outputs the error-correction coded data to a recording encoder 160. The recording encoder 160 modulates the error-correction coded data to be suitable for the characteristics of a channel according to a predetermined modulation scheme, equalizes the modulated data in order to compensate for recording deterioration characteristics, and then applies the equalized result to a recording amplifier 170. The signal amplified by the recording amplifier 170 is recorded on a tape T by a recording head HD1.

The signal recorded on the tape T is read by a playback head HD2, and the read signal is amplified by a playback amplifier 210. A data detector 220 detects video and audio data in units of a synchronous block from the signal amplified by the playback amplifier 210. An error correction decoder 230 corrects errors of the video and audio data detected by the data detector 220, and then applies the error-correction decoded video and audio data to a video data decoder 240 and an audio data decoder 250. The video data decoder 240 decodes the error-correction decoded video data, and outputs a restored video signal via a first digital-to-analog converter (DAC) 260. The audio data decoder 250 decodes the error-correction decoded audio data and outputs a restored audio signal via a second DAC 270.

Figure 2:
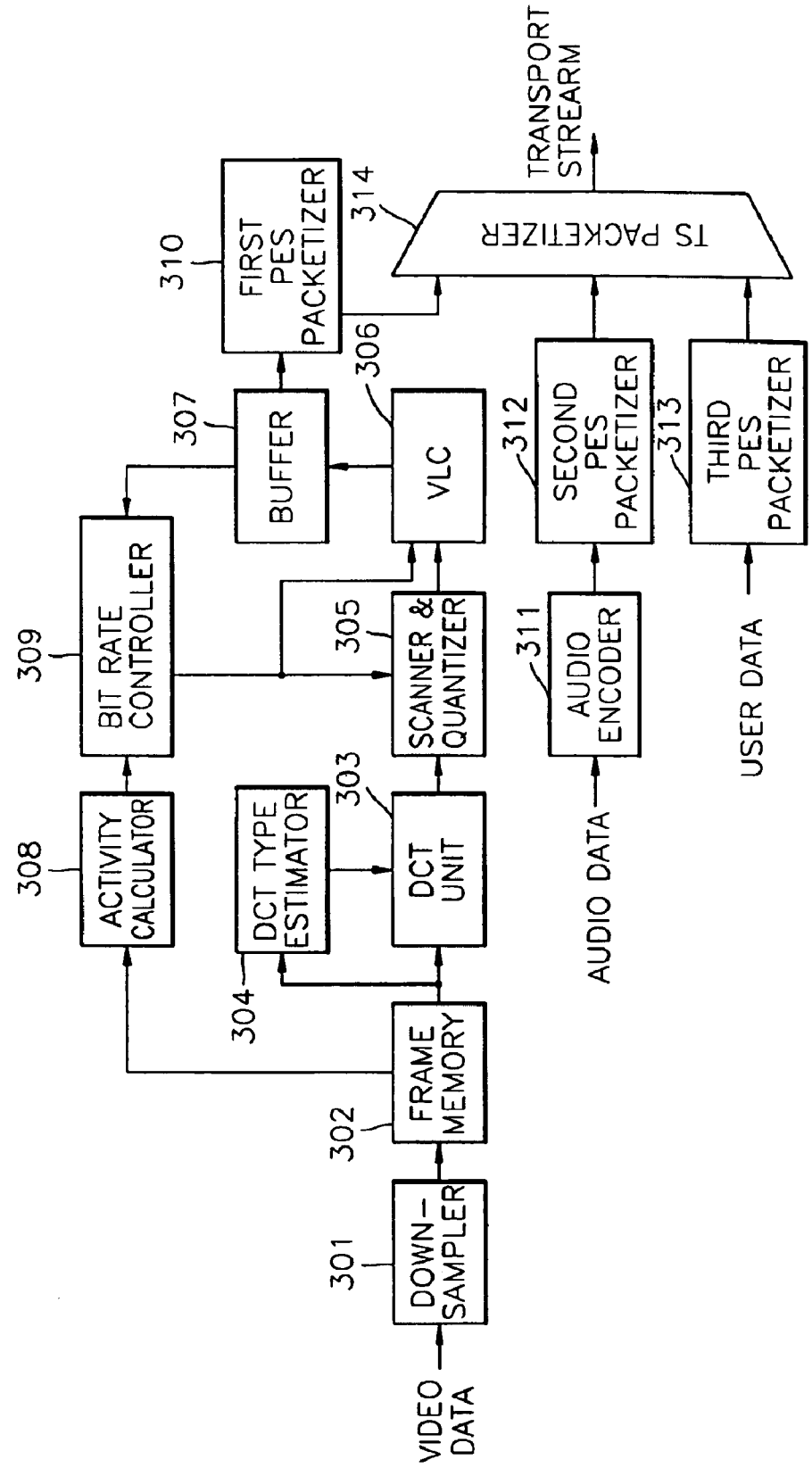
FIG. 2 is a block diagram of an audio and video data encoder of the digital recording and playback apparatus according to the present invention.

FIG. 2 shows an audio and video data encoder of the digital recording and playback apparatus according to a preferred embodiment of the present invention. A color signal of an image signal which is input in picture units, unlike a luminance signal which includes most of the information which can be visually detected, is sub-sampled by a down-sampler 301, and then applied to a frame memory 302 as shown in FIG. 2.

A discrete cosine transform (DCT) unit 303 performs a DCT on the image data supplied from the frame memory 302. The DCT, in which energy is concentrated in the low frequency domain, is used in the international standards for compression of other image signals as well as in the MPEG-1 and MPEG-2 standards. Because the human eye is more sensitive to low frequency components than high frequency components, a viewer can scarcely detect image deterioration even if many high frequencies are removed. A spatial pixel value is transformed into the frequency domain by the DCT. The DCT cannot compress image data by itself, so the quantization is performed as well as the DCT.

A DCT type estimator 304 estimates which compression rate is higher between when the DCT is performed on image data stored in the frame memory 302 in frame units or in field units, to determine a DCT type. The estimated DCT type is applied to a DCT unit 303. In general, the field unit DCT provides a higher compression efficiency for an image with a high degree of motion.

Unlike MPEG-1, MPEG-2 provides two DCT modes: frame DCT mode and field DCT mode. That is, the DCT is performed by one frame in the frame DCT mode. On the other hand, in the field DCT mode, one frame is divided into two fields, i.e., odd-number field and even-number field, and the DCT is separately performed in each field.

A scanner & quantizer 305 quantizes DCT coefficients supplied from the DCT unit 303, to increase the compression rate, wherein the compression rate is increased by increasing a step size if the bitstream to be coded exceeds a predetermined bit amount. On the contrary, if the bitstream to be coded is less than the predetermined bit amount, the compression rate is relatively lowered by decreasing the step size.

In the present invention, the scanner & quantizer 305 has a quantization table only for luminance and color signals because motion estimation (ME) is not used. Meanwhile, in MPEG-2, in order to increase the compression rate by removing a temporal redundancy with the previous frame, after the block which is the most similar (matching block) to the macroblock (reference block) of the current frame is found from the previous frame, a motion vector corresponding to the position difference between the reference block and the matching block, and an estimation error corresponding to the difference in pixel values between the reference block and the matching block, is generated and coded. Thus, a quantizer adopted by MPEG-2 uses quantization tables each storing step sizes having different weights according to macroblocks (intra macroblock) which do not use motion estimation, macroblocks (inter macroblock) using the motion estimation, and the luminance and color signals. However, because the present invention does not use motion estimation, a motion estimator requiring much computing is not necessary. Also, the present invention does not use a frame memory for the motion estimation and a local decoder, thereby decreasing hardware size.

Image compression coding and decoding relating to MPEG-2 are defined by ISO/IEC 13818-2. In ISO/IEC 13818-2, terms for describing the decoding process, syntax and hierarchical structure of bitstream, various parameters, and processes including variable length decoding (VLD), inverse scanning (ISCAN), inverse quantization (IQ), inverse discrete cosine transform (IDCT) and motion compensation (MC) are described.

Also, transform coefficients having undergone the DCT and quantization include many "0"s due to the quantization, so the compression rate is increased by performing run-length coding (RLC). To increase the efficiency of the RLC, only the coefficients having "0" must be arranged in a row, thus the scanner & quantizer 305 scans the quantized DCT coefficients in a zig-zag direction to be arranged in a row. This process is referred to as "scanning".

A variable length coder (VLC) 306 performs both RLC and VLC. In the run length coding, the number of consecutive "0"s and the following non-zero coefficient are output as a symbol using the characteristics of the DCT coefficients having many zeros. In the variable length coding, the compression rate is increased by a probabilistic method. That is, the shortest code word is allocated to the symbol data which has the highest probability of occurring among the run-length-coded symbols, and the longest code word is allocated to the symbol data having a relatively low probability of occurring. Also, the VLC 306 multiplexes the variable-length coded data and the step size information supplied from a bit rate controller 309. A buffer 307 accumulates the bit amount of the bit stream supplied from the VLC 306, and applies the accumulated bit amount to the bit rate controller 309.

Also, an activity calculator 308 calculates activity of the image data supplied from the frame memory 302 to estimate the bit amount in picture and slice units. The activity calculator 308 may be called a "forward analyzer".

That is, for editing in picture units and for high-speed search, recording is performed while the compressed bit amount is fixed to a predetermined amount per picture, and a unit for independent decoding must be small for high-speed search. For effective compression coding satisfying the above conditions, the bit amount for each slice layer is allocated by normalizing between an information amount (the sum of absolute values of DCT coefficients) of each slice layer with the bit amount of one fixed picture. Also, the activity calculator 308 estimates the quantization step size such that a bit amount which is approximately equal to the allocated bit amount can be output. The estimated quantization step size may be the quantization step size in slice units, or the quantization step size in macroblock units of the slice layer.

Because the compressed bit amount in picture units is fixed, compression in a range out of a predetermined bit amount must be prevented in order to obtain maximum picture quality. Thus, the bit rate controller 309 controls the quantization step size in macroblock units during the actual coding process, such that the bit amount accumulated in the buffer 307 is not greater than the bit amount allocated in slice units, calculated by the activity calculator 308, and applies the actual quantization step size updated in macroblock units to the scanner & quantizer 305.

During the actual coding process, the scanner & quantizer 305 quantizes DCT coefficients according to the quantization step size estimated based on the bit amount allocated in slice units by the activity calculator 308. If the bit amount accumulated in the buffer 308 is out of the bit amount allocated in slice units, the bit rate controller 309 controls the estimated quantization step size in macroblock units such that the accumulated bit amount approximates the allocated bit amount, and the scanner & quantizer 305 then quantizes DCT coefficients according to the actual quantization step size controlled in macroblock units. While the bit amount of the slice unit is variable, the bit amount in a picture is fixed because recording is performed in a predetermined region of a video tape. If the accumulated bit amount is more than the bit amount allocated to each slice, the excessive bit amount is transferred to the next slice for the coding process, so that the accumulated bit amount does not exceed the target bit amount of a picture. Thus, editing in picture units is possible by controlling the bit amount to be recorded on a video tape.

A first packetized elementary stream (PES) packetizer 310 packetizes the bit stream supplied from the buffer 307 into a PES. An audio encoder 311 encodes input audio data, and the second PES packetizer 312 packetizes the coded audio bit stream into a PES. Here, the video data input to the down-sampler 301 is supplied from the first ADC 110, and the audio data input to the audio encoder 311 is supplied from the second ADC 120. Also, a transport stream (TS) output from a TS packetizer 314 may be applied to the error correction encoder 150.

The TS packetizer 314 packetizes and then multiplexes the video data packetized by the first PES packetizer 310 and the audio data packetized by the second PES packetizer 312, into a TS suitable for transmission or storage. The TS may include user data required for a system as well as the video and audio data. That is, a third PES packetizer 313 packetizes the input user data into PES and applies the PES to the TS packetizer 314. Here, the embodiment of the present invention shown in FIG. 2 includes three separate packetizers 310, 312 and 313. However, a single packetizer may be used.

Figure 3:
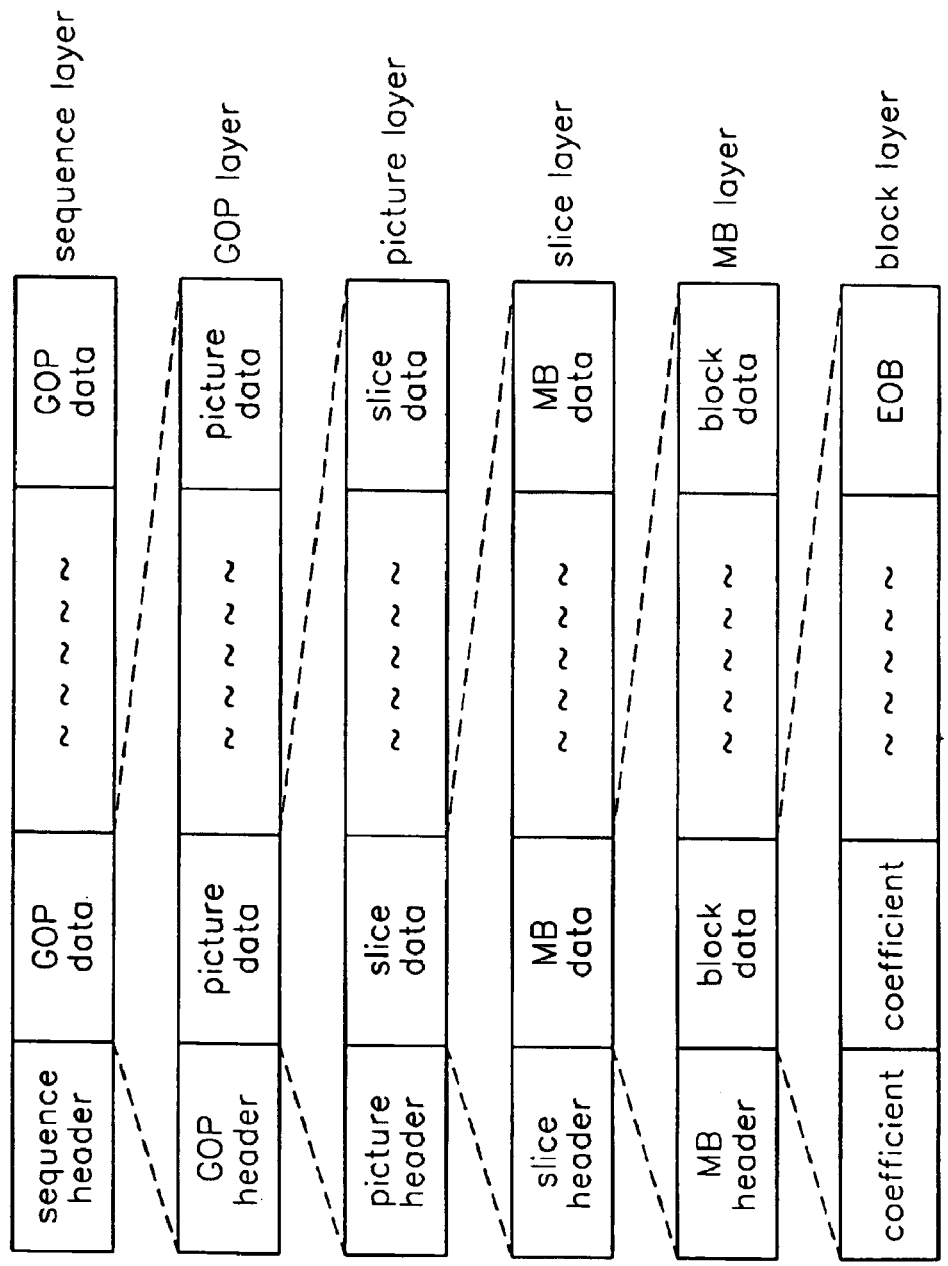
FIG. 3 shows a hierarchical structure of the MPEG-2 bitstream.

The image data after multiplexing (called "syntax" in the MPEG-2) by the TS packetizer 314 has a hierarchy structure of six layers including a sequence layer, GOP layer, picture layer, slice layer, macroblock (MB) layer and block layer, as shown in FIG. 3. The hierarchy structure shown in FIG. 3 follows the hierarchy structure of the MPEG-2 bit stream.

In FIG. 3, the sequence layer represents a group of pictures having the same attributes, including screen size, screen ratio and the like. The GOP layer is the minimum unit of the picture group, as random access units. The GOP layer of the present invention is constituted by one picture for editing in picture units. The picture layer has a picture coding mode as a common attribute in a picture. In the present invention, an intra coding mode, that is, only intra picture, is used. The slice layer is the common information of sub-pictures which have been divided from a picture by a predetermined length, and includes quantization information. The MB layer is a block obtained by dividing the slice layer. Lastly, the block layer includes information of DCT coefficients.

For high-speed search using the multiple-layer MPEG-2 structure, the slice unit is compressed into a structure including only several macroblocks, in addition to editing in picture units.

In addition, the slice layer defined by MPEG-2 is the minimum unit of series of data streams having a start code, and a macroblock band having an arbitrary length, which cannot exist over a plurality of pictures. The first and last macroblocks cannot be skipped. Thus, if a slice layer includes only one macroblock, it is impossible to skip the macroblock. Overlap or skip among the slice layers is not allowed. The vertical position of the slice includes a slice start code itself and the horizontal position of the leading macroblock of the slice is expressed by using a macroblock address (MBA) of the macroblock layer. Also, quantization step size information and additional information may be written after the start code, including the vertical position of the slice.

In the present invention, the features of the slice layer are used without extra recording of data for high-speed search, so the playback can be achieved by using only the data read by the head, in a multiple times speed mode. That is, in a conventional digital recording and playback apparatus (camcorder) for SD, the bit amount is fixed in every segment unit including five macroblocks for independent coding in segment units. Then, during the playback mode at an arbitrary multiple times speed, the data read by a head is displayed on a screen in segment units for independent decoding. Because the conventional segment has a constant amount of compressed data regardless of the input image information, the same bit amount is allocated to all segments within a picture for recording.

However, in the present invention, the slice layer is constituted by only several macroblocks based on the concept of a segment used in an SD format, for high-speed search, while using the MPEG-2 compression method. That is, while several macroblocks for SD are applied to the slice layer in the present invention, the compressed bit amount may be varied and the bit amount of a picture is fixed to a predetermined amount for recording on a video tape. High-speed search is made possible by using the slice unit having only several macroblocks.

Figure 4:
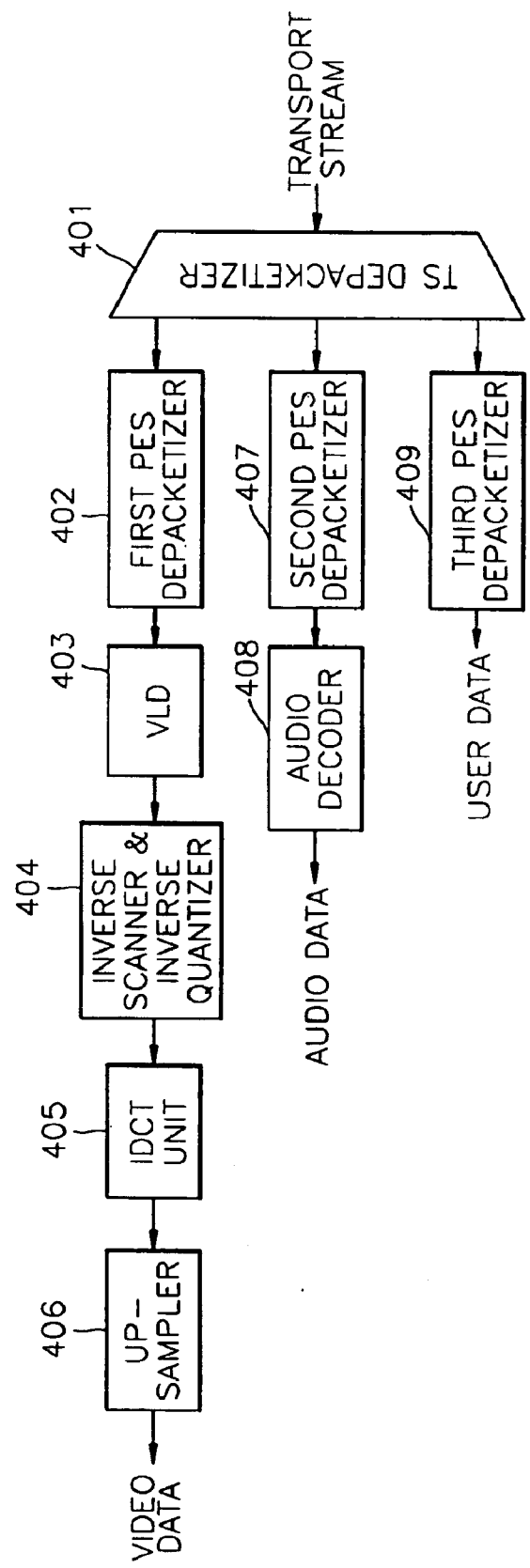
FIG. 4 is a block diagram of an audio and video data decoder of the digital recording and playback apparatus according to the present invention.

FIG. 4 is a block diagram of a video/audio data decoder of a digital recording and playback apparatus according to the present invention. The decoding process is the reverse process to the coding illustrated with reference to FIG. 2, so the explanation thereof will be brief. In FIG. 4, a TS depacketizer 401 demultiplexes an input TS into a video PES and audio PES. A third PES depacketizer 409 extracts the user data PES if the TS stream includes user data, and depacketizes the user data PES supplied from the TS depacketizer 401.

A first PES depacketizer 402 depacketizes the video PES extracted from the TS and applies the depacketized video bit stream to a variable length decoder (VLD) 403. The VLD 403 separates quantization step size information and video data from the video bit stream, variable-length-decodes the video bit stream, and run-length-decodes the variable-length-decoded data.

An inverse scanner & inverse quantizer 404 inverse-scans the run-length-decoded data and inverse quantizes the inverse-scanned data according to the quantization step size applied during the coding process. An IDCT unit 405 performs IDCT on the inverse quantized data. An up-sampler 406 up-samples a color signal, which has been sub-sampled during the coding process, from the IDCT-video data, to restore the video data.

A second PES depacketizer 407 depacketizes the audio PES extracted from the TS to output audio bit steam, and an audio decoder 408 decodes the audio bit stream to restore the audio data.

Here, the TS input to the TS depacketizer 401 is supplied from the error-correction decoder 230 shown in FIG. 1, the video data restored by the up-sampler 406 is applied to the first DAC 250, and the audio data decoded by the audio decoder 408 is applied to the second DAC 270. Also, even though this embodiment of the present invention adopts three separated PES depacketizers 402, 407 and 409, a single PES depacketizer may be adopted.

Because the present invention does not adopt a method based on correlation between the current and previous pictures, to allow editing in picture units, motion estimation is not performed for the coding process, nor is motion compensation performed for the decoding process. That is, editing in picture units is possible because only intra picture coding is used, and the compression is performed in slice units having several macroblocks while the bit amount in a picture is fixed, so high-speed search can be achieved and the bit stream having a format of the system layer based on the MPEG-2 is also possible.

A conventional digital video camcorder performs compression based on its own format for high-speed search, regardless of being MPEG-2 compatible. However, the present invention is compatible with a digital television or multimedia applications satisfying the MPEG-2 standard, and can perform editing in picture units as well as high-speed search, which is the main function of the digital video camcorder, thereby widening the application fields of a digital video camcorder. Thus, since the present invention can be applied to multimedia products based on MPEG-2, it has a very wide field of application.

As described above, the digital recording and playback apparatus and the method thereof according to the present invention can be compatible with a next-generation digital television using MPEG-2, and various multimedia products which require decoding based on MPEG-2, by adopting MPEG-2 coding and decoding schemes, and can perform picture-unit editing and high-speed search.

What is claimed:

1. A digital recording and playback apparatus for recording and playing back digital data, comprising:

a first encoder for coding input video data in picture units, and outputting coded video data, wherein the input video data includes data other than P-data, and at least said data other than P-data is converted using only an intra coding mode;

a second encoder for coding input audio data and outputting coded audio data;

a packetized elementary stream (PES) packetizer for packetizing the coded video data and the coded audio data and user data into each PES, and outputting a video PES, an audio PES and a user PES; and a transport stream (TS) packetizer for multiplexing the video PES, the audio PES and the user PES into a TS.

2. The digital recording and playback apparatus of claim 1, wherein the first encoder comprises:

a discrete cosine transform (DCT) unit for performing DCT on the input video data in picture units according to a DCT mode, to generate DCT coefficients;

a scanner & quantizer for quantizing the DCT coefficients according to a quantization step size and arranging quantized data in a row;

a variable length encoder for run-length-coding the quantized data arranged in a row, and variable-length-coding the run-length-coded data, and outputting variable-length-coded data;

a buffer for accumulating a bit amount of the variable-length-coded data and outputting an accumulated bit amount;

an activity calculator for calculating activity of the video data and allocating the bit amount in slice units; and a bit rate controller for controlling the quantization step size such that the accumulated bit amount is not over the bit amount allocated in slice units.

3. The digital recording and playback apparatus of claim 2, wherein the activity calculator estimates the quantization step size in slice units based on the bit amount allocated in slice units.

4. The digital recording and playback apparatus of claim 2, wherein the activity calculator estimates the quantization step size in macroblock units based on the bit amount allocated in slice units.

5. The digital recording and playback apparatus of claim 2, wherein the bit rate controller controls the quantization step size in macroblock units.

6. The digital recording and playback apparatus of claim 1, further comprising:

a TS depacketizer for extracting the video PES, the audio PES and the user PES from the TS;

a PES depacketizer for depacketizing the video PES, the audio PES and the user PES into a video bit stream, an audio bit stream and a user bit stream, respectively;

a first decoder for restoring the video data from the video bit stream; and a second decoder for restoring the audio data from the audio bit rate.

7. The digital recording and playback apparatus of claim 6, wherein the first decoder comprises:

a variable length decoder for variable-length-decoding the video data by extracting the video data and quantization step size information from the video bit stream, run-length-decoding variable-length-decoded data, and outputting the run-length-decoded data;

an inverse scanner & inverse quantizer for inverse-scanning the run-length-decoded data and inverse quantizing the inverse-scanned data according to the quantization step size information, and outputting the inverse quantized data; and an inverse discrete cosine transform (IDCT) unit for performing an IDCT on the inverse quantized data and outputting IDCT data.

8. The digital recording and playback apparatus of claim 7, wherein the first decoder further comprises an up-sampler for up-sampling a color signal, which has been down-sampled during a coding process, from the IDCT data.

9. The digital recording and playback apparatus of claim 1, wherein the output coded video data is only I-data.

10. A digital recording and playback apparatus for recording and playing back digital data, comprising:

a first encoder for coding input video data in picture units, and outputting coded video data;

a second encoder for coding input audio data and outputting coded audio data;

a packetized elementary stream (PES) packetizer for packetizing the coded video data and the coded audio data and user data into each PBS, and outputting a video PES, an audio PES and a user PES; and a transport stream (TS) packetizer for multiplexing the video PES, the audio PES and the user PES into a TS, wherein the first encoder comprises:

a discrete cosine transform (DCT) unit for performing DCT on the input video data in picture units according to a DCT mode, to generate DCT coefficients;

a scanner & quantizer for quantizing the DCT coefficients according to a quantization step size and arranging quantized data in a row;

a variable length encoder for run-length-coding the quantized data arranged in a row, and variable-length-coding the run-length-coded data, and outputting variable-length-coded data;

a buffer for accumulating a bit amount of the variable-length-coded data and outputting an accumulated bit amount;

an activity calculator for calculating activity of the video data and allocating the bit amount in slice units;

a bit rate controller for controlling the quantization step size such that the accumulated bit amount is not over the bit amount allocated in slice units, after variable-length-coding the run-length-coded data;

a down-sampler for sub-sampling a color signal from input video data;

a frame memory for storing the video data received directly from the down-sampler; and a DCT type estimator for estimating which compression rate is higher between when the video data stored in the frame memory is discrete-cosine-transformed in frame units or field units.

11. A digital recording and playback apparatus for recording and playing back digital data, comprising:

a first encoder for coding input video data in picture units, and outputting coded video data, wherein the video data is coded by an intra coding mode;

a second encoder for coding input audio data and outputting coded audio data;

a packetized elementary stream (PES) packetizer for packetizing the coded video data and the coded audio data and user data into each PES, and outputting a video PES, an audio PES and a user PES; and a transport stream (TS) packetizer for multiplexing the video PES, the audio PES and the user PES into a TS, wherein the TS packetizer multiplexes a TS having a 6-hierarchy structure including a sequence layer representing a group of pictures having the same attributes, a group of picture (GOP) layer having one picture for editing in picture units, a picture layer having only an intra picture, a slice layer having quantization information which is common information of sub-pictures obtained by dividing one picture by a predetermined length, a macroblock layer further divided from the slice layer, and a block layer having DCT coefficients.

12. A digital recording and playback method comprising the steps of:

(a) coding input video data in picture units, to generate coded video data, wherein the input video data includes data other than P-data, and at least said data other than P-data is converted using only an intra coding mode;

(b) coding input audio data to generate coded audio data;

(c) packetizing the coded video data into a packetized elementary stream (PES) to generate a video PES;

(d) packetizing the coded audio data into a PES to generate an audio PES;

(e) packetizing user data into a PES to generate a user PES; and (f) multiplexing the video PES, the audio PES and the user PES into a transport stream (TS).

13. The digital recording and playback method of claim 12, wherein in the step (a), the coding is performed in slice units having a plurality of macroblocks, to allow playback at a multiple times speed.

14. The method of claim 12, further comprising the steps of:

(g) extracting a video PES, an audio PES and a user PES from the TS;

(h) depacketizing the video PES into a video bit stream;

(I) depacketizing the audio PES into an audio bit stream;

(j) depacketizing the user PES into the user data;

(k) restoring the video data from the video bit stream; and (l) restoring the audio data from the audio bit stream.

15. The method of claim 14, wherein the step (k) comprises the sub-steps of:

(k1) extracting the video data and quantization step size information from the video bit stream to variable-length-decode the video data, and outputting variable-length-decoded data;

(k2) run-length-decoding the variable-length-decoded data to output the run-length-decoded data;

(k3) inverse-scanning the run-length-decoded data to output the inverse-scanned data;

(k4) inverse quantizing the inverse-scanned data according to the quantization step size information to output inverse quantized data;

(k5) performing an inverse-discrete-cosine-transform (IDCT) on the inverse quantized data, to apply the IDCT data; and (k6) up-sampling a color signal, which has been down-sampled during a coding process, from the IDCT data, and restoring the video data.

16. The digital recording and playback method of claim 12, wherein the generated coded video data is only I-data.

17. A digital recording and playback method comprising the steps of:

(a) coding input video data in picture units for coding, to generate coded video data, wherein the video data is coded by an intra coding mode;

(b) coding input audio data to generate coded audio data;

(c) packetizing the coded video data into a packetized elementary stream (PES) to generate a video PES;

(d) packetizing the coded audio data into a PES to generate an audio PES;

(e) packetizing user data into a PES to generate a user PES; and (f) multiplexing the video PES, the audio PES and the user PES into a transport stream (TS), wherein the step (a) comprises the sub-steps of:

(a1) sub-sampling a color signal from the input video data in picture units;

(a2) performing a discrete cosine transform (DCT) on the input video data in picture units, according to a DCT mode, to generate DCT coefficients;

(a3) estimating which compression rate is higher between when the DCT is performed on the video data in frame units and when the DCT is performed on the video data in field units, to generate a control signal according to the DCT mode;

(a4) quantizing the DCT coefficients according to a quantization step size, to generate quantized data;

(a5) arranging the quantized data in a row;

(a6) run-length-coding the quantized data arranged in a row, to output run-length-coded data;

(a7) variable-length-coding the run-length-coded data, to output variable-length-coded data;

(a8) accumulating a bit amount of the variable-length-coded data, to output an accumulated bit amount;

(a9) calculating activity of the video data to allocate the bit amount in slice units; and (a10) controlling the quantization step size such that the accumulated bit amount is not greater than the bit amount allocated in slice units.

18. The method of claim 17, wherein the bit amount in slice units is varied and the bit amount in a picture is fixed, and if the accumulated bit amount is greater than the bit amount allocated in slice units, the remaining bit amount is transferred to the next slice to be used for data coding in the next slice.

19. The method of claim 17, wherein the step (a) further comprises the sub-step of estimating the quantization step size in slice units based on the bit amount allocated in slice units.

20. The method of claim 17, wherein the step (a) further comprises the sub-step of estimating the quantization step size in macroblock units based on the bit amount allocated in slice units.

21. The method of claim 17, wherein in the sub-step (a10) the quantization step size is controlled in macroblock units.

* * * * *